(12) United States Patent
Habusha et al.

(10) Patent No.: US 10,503,624 B1
(45) Date of Patent: Dec. 10, 2019

(54) TIME-BASED ON-CHIP HARDWARE PERFORMANCE MONITOR

(71) Applicant: Amazon Technologies, Inc., Seattle, WA (US)

(72) Inventors: Adi Habusha, Moshav Alonei Abba (IL); Itai Avron, Petah Tikva (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/118,002

(22) Filed: Aug. 30, 2018

Related U.S. Application Data

(62) Division of application No. 14/848,139, filed on Sep. 8, 2015, now Pat. No. 10,067,847.

(51) Int. Cl.
*G06F 11/30* (2006.01)
*G06F 11/34* (2006.01)

(52) U.S. Cl.
CPC ...... *G06F 11/3409* (2013.01); *G06F 11/3466* (2013.01)

(58) Field of Classification Search
CPC ............ G06F 11/3409; G06F 11/3466; G06F 2201/86; G06F 2201/88; G06F 2201/81
USPC ........................................................ 702/186
See application file for complete search history.

(56) References Cited

U.S. PATENT DOCUMENTS

| | | | |
|---|---|---|---|
| 4,670,711 A | 6/1987 | Daniels et al. | |
| 5,796,682 A | 8/1998 | Swapp et al. | |
| 5,959,479 A | 9/1999 | Woodward et al. | |
| 6,112,119 A | 8/2000 | Schuelke et al. | |
| 6,611,724 B1 | 8/2003 | Buda et al. | |
| 2005/0222630 A1 | 10/2005 | Schermeier et al. | |
| 2010/0150122 A1 | 6/2010 | Berger et al. | |
| 2012/0079482 A1 | 3/2012 | Wang et al. | |
| 2012/0221873 A1 | 8/2012 | Wells et al. | |
| 2014/0281653 A1 | 9/2014 | Gilda et al. | |
| 2016/0179117 A1 | 6/2016 | Eastep et al. | |
| 2016/0179173 A1 | 6/2016 | Eastep et al. | |

OTHER PUBLICATIONS

U.S. Appl. No. 14/848,139, "Non-Final Office Action", dated Dec. 27, 2017, 9 pages.
U.S. Appl. No. 14/848,139, "Notice of Allowance", dated May 14, 2018, 10 pages.
U.S. Appl. No. 14/848,139, "Restriction Requirement", dated Oct. 13, 2017, 6 pages.

*Primary Examiner* — Long K Tran
(74) *Attorney, Agent, or Firm* — Kilpatrick Townsend & Stockton LLP (57) ABSTRACT

Disclosed herein is a distributed performance monitor circuit that includes a plurality of performance monitors connected to a cross-trigger network. Each performance monitor corresponds to a respective functional block of a system and includes a counter circuit. The counter circuit includes a programmable time window counter configured to determine an adjustable counting period, and an event counter configured to count a number of occurrences of an event occurring in the respective functional block during the counting period. The cross-trigger network is configured to receive an output trigger signal generated by a performance monitor when the number of occurrences of the event occurring in the corresponding functional block during the counting period is outside of a threshold band for the performance monitor, and send an input trigger signal to the plurality of performance monitors based on receiving the output trigger signal.

15 Claims, 10 Drawing Sheets

TIME-BASED ON-CHIP HARDWARE PERFORMANCE MONITOR

CROSS REFERENCE TO RELATED APPLICATIONS

This Application is a Divisional of U.S. application Ser. No. 14/848,139, filed Sep. 8, 2015, issued as U.S. Pat. No. 10,067,847 on Sep. 4, 2018, and titled "TIME-BASED ON-CHIP HARDWARE PERFORMANCE MONITOR," the entire content of which is herein incorporated by reference for all purposes.

BACKGROUND

Performance monitors, such as software profilers or hardware performance monitors, can be used in integrated circuits or computer systems to gather various data on the operations of the integrated circuits or computer systems. Compared to software profilers, hardware performance monitors provide low-overhead access to detailed performance information related to functional blocks of the integrated circuits or computer system, such as CPU, network, caches and main memory. Another benefit of using hardware performance monitors is that, in general, no source code modifications are needed.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will be apparent to one skilled in the art that the embodiments may be practiced without the specific details. Furthermore, well-known features may be omitted or simplified in order not to obscure the embodiment being described.

As used here, a system may include a system made of discrete components and/or integrated circuits, a system on a chip, or a system in a package. "Performance monitoring unit" (PMU) and "performance monitor" are used interchangeably throughout the present disclosure. An "event" may refer to a type of activities or status changes occurring in a system, in a functional block, or between functional blocks, such as, for example, exception errors, overflows, caches access, translation lookaside buffer accesses, external bus accesses, memory reads/writes, or congestions. An event may also refer to a status of a system or a functional block, such as, for example, unused memory space, temperature, power consumption, voltage, or current. For example, a low unused memory space may be an occurrence of an event, and a power consumption exceeding a threshold value may be an occurrence of another event.

A centralized performance monitor may not be able to concurrently monitor the operations of different functional blocks in a system. Furthermore, because of limited access to and control of different functional blocks using a centralized performance monitor or a system level tool, when the exact time and location of a hardware failure are unknown, it is often difficult to debug the root cause for specific performance fluctuations and instability that only last for a short period of time.

A performance monitoring subsystem with a plurality of performance monitors distributed onto various functional blocks of a system enables concurrent monitoring of events occurring in each functional block. Cross triggering between different performance monitors could facilitate hardware debugging through correlations between events occurring in one functional block and events occurring in another functional block or correlations between different events occurring in a same functional block.

Techniques described herein generally relate to performance monitoring units for monitoring operations of different functional blocks of a computer system. The system includes a plurality of performance monitoring units distributed onto different functional blocks of the system. Each performance monitoring unit may include one or more event counters to count different events in a functional block in configurable time windows. The system also includes a PMU cross trigger network that is coupled to or in electrical communication with the event counters in different performance monitoring units for monitoring the status of the event counters and controlling the operations of the event counters, such that one event counter may generate a trigger signal that can control the operations of other event counters connected to the PMU cross trigger network.

The event counters are a set of special purpose registers built into microprocessors or other circuitry to store the counts of hardware-related activities. Advanced users can use these counters to conduct lower level performance analysis, debug or optimization of various functional blocks of a system or an integrated circuit.

I. System Architecture

Figure 1:
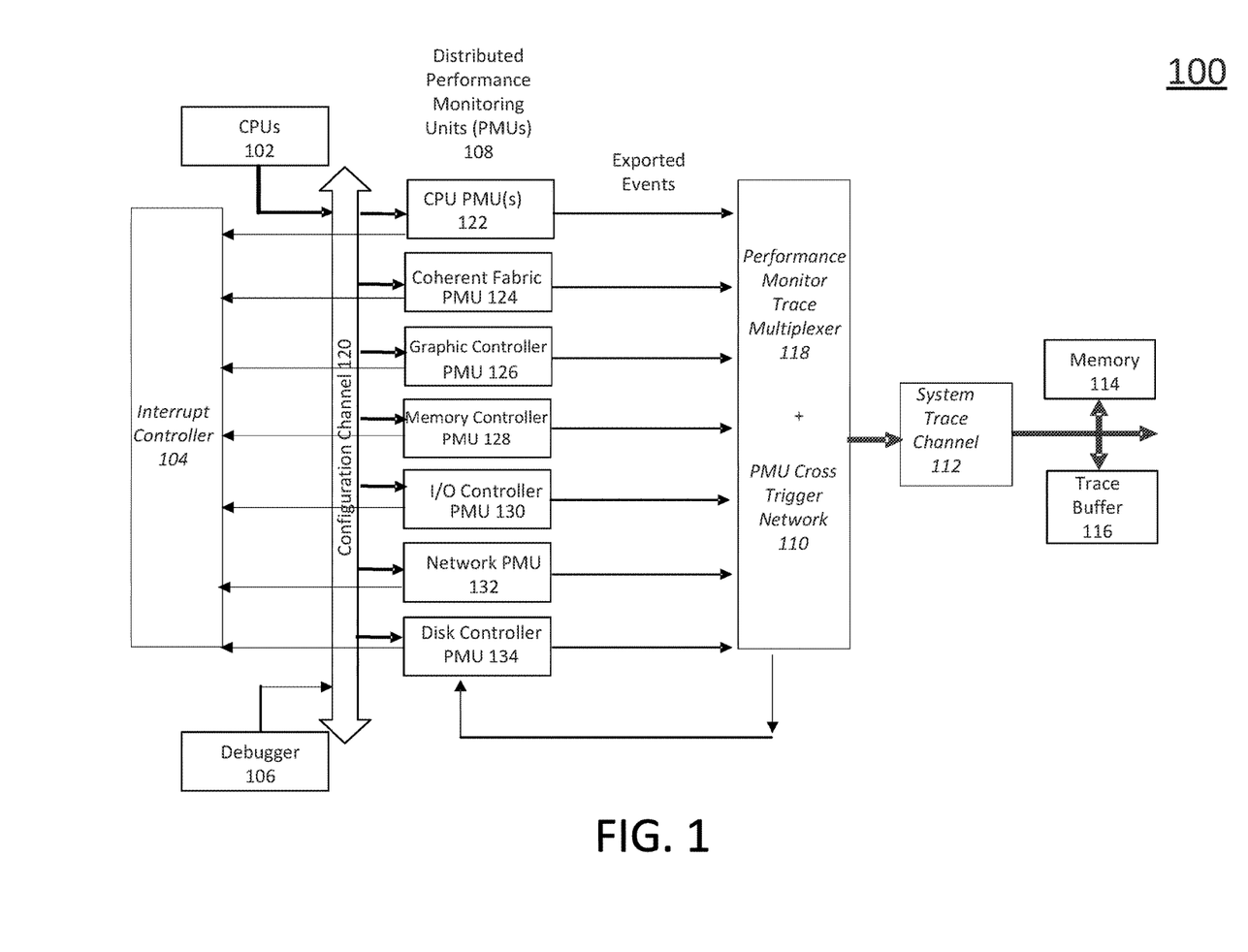
FIG. 1 illustrates a block diagram of a distributed performance monitoring subsystem in a computer system.

FIG. 1 illustrates a block diagram of a distributed performance monitoring subsystem in a computer system 100. System 100 includes a plurality of distributed performance monitoring units (PMUs) 108 configured to concurrently monitor and gather various statistical data of the operations of various functional blocks of system 100, such as processors, memory, high-speed peripherals and internal interconnects, network interfaces, and other functional blocks. The statistical data provides useful real-time information about processes and data traffic within system 100 that can be used to debug or profile system 100 and its functional blocks.

PMUs 108 are distributed onto different functional blocks of system 100, enabling concurrent monitoring and tracing of the various functional blocks.

System 100 may also include one or more CPUs 102, an interrupt controller 104 for handling interrupt requests from PMUs 108, a debugger 106, and a configuration channel 120 for controlling and debugging the plurality of PMUs. System 100 also includes a performance monitor trace multiplexer 118 connected to PMUs 108 for tracing out statistical data of events in various functional blocks from PMUs 108, through a system trace channel 112, to a memory 114 or a dedicated trace buffer 116. PMUs 108 may also be connected to a PMU cross trigger network 110, such that the plurality of PMUs 108 can cross trigger each other upon the occurrence of certain events.

1. Distributed Performance Monitors

As shown in FIG. 1, PMUs 108 are distributed onto various functional blocks across system 100, enabling fine-grained and concurrent profiling of the various functional blocks. PMUs 108 may include one or more CPU PMUs 122 with internal control to trace events concurrently with code execution for each CPU, an internal interconnect or coherent fabric (system and I/O fabrics) PMU 124 enabling real-time traffic profiling, integrated accelerators and peripherals performance monitors, such as a graphic controller PMU 126 and an input/output controller PMU 130, a memory controller PMU 128 for memory efficiency profiling, a network PMU 132, or a disk controller PMU 134.

2. Software Tools

The distributed performance monitoring subsystem as shown in FIG. 1 provides the infrastructure for software tools for system performance analysis, visualization and optimization, such as a software based profiler. The distributed performance monitors count total pre-defined events in each time window and provide average number of event-per-second information, such as data-throughput, stall events, or queues full status. A software tool may be configured to show all events of functional blocks monitored by the distributed performance monitors within a time window, detailed traces of processes and threads colored based on resource usage (such as CPU time), performance of individual functional block or aggregated system performance, highlighted suspected events or unusual events, and possible optimization to the system.

Figure 2:
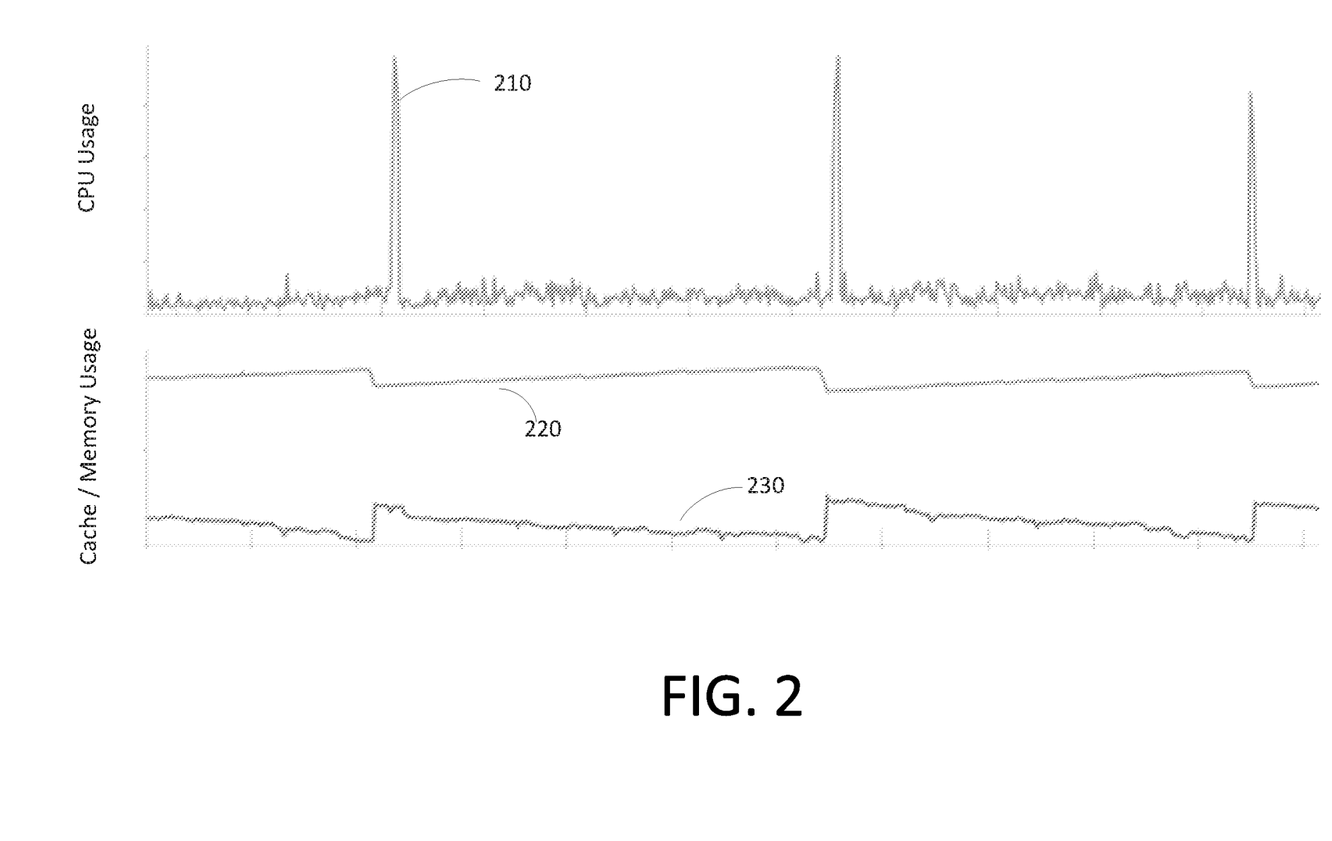
FIG. 2 illustrates a graphical user interface of an example software tool.

FIG. 2 illustrates a user interface of an example software tool for collecting and displaying data collected by a plurality of PMUs. The software tool transforms system trace and sampling data into reports that present the data in both visual and statistical forms. Events and activities of different functional blocks may be shown side-by-side. When a performance degradation happens on one functional block around a certain time, events and activities of other functional blocks at around the same time may provide information on the root cause of the performance degradation. For example, as shown in FIG. 2, curve 210 represents CPU usage, curve 220 represents cache usage, and curve 230 represents unused free memory space. The software tool shows that, at the time a spike shows up on curve 210, the unused free memory space reaches a minimum level. Thus, one possible cause of the CPU usage spike could be the high memory usage. Conversely, one possible cause of the high memory usage could be the high CPU usage. In this way, correlations between different events may be apparent to a user.

II. Architecture of Performance Monitoring Units

It is desirable for the performance monitors for different functional blocks or different integrated circuits to have a common architecture for easy implementation and control in both hardware and software. Embodiments of the present disclosure use a common architecture as described below for performance monitoring units used in various functional blocks. To enable an analysis, visualization and optimization of system performance using software tools, such as ARM Streamline Performance Analyzer, different embodiments of performance monitoring units may include various features as described below.

Figure 3:
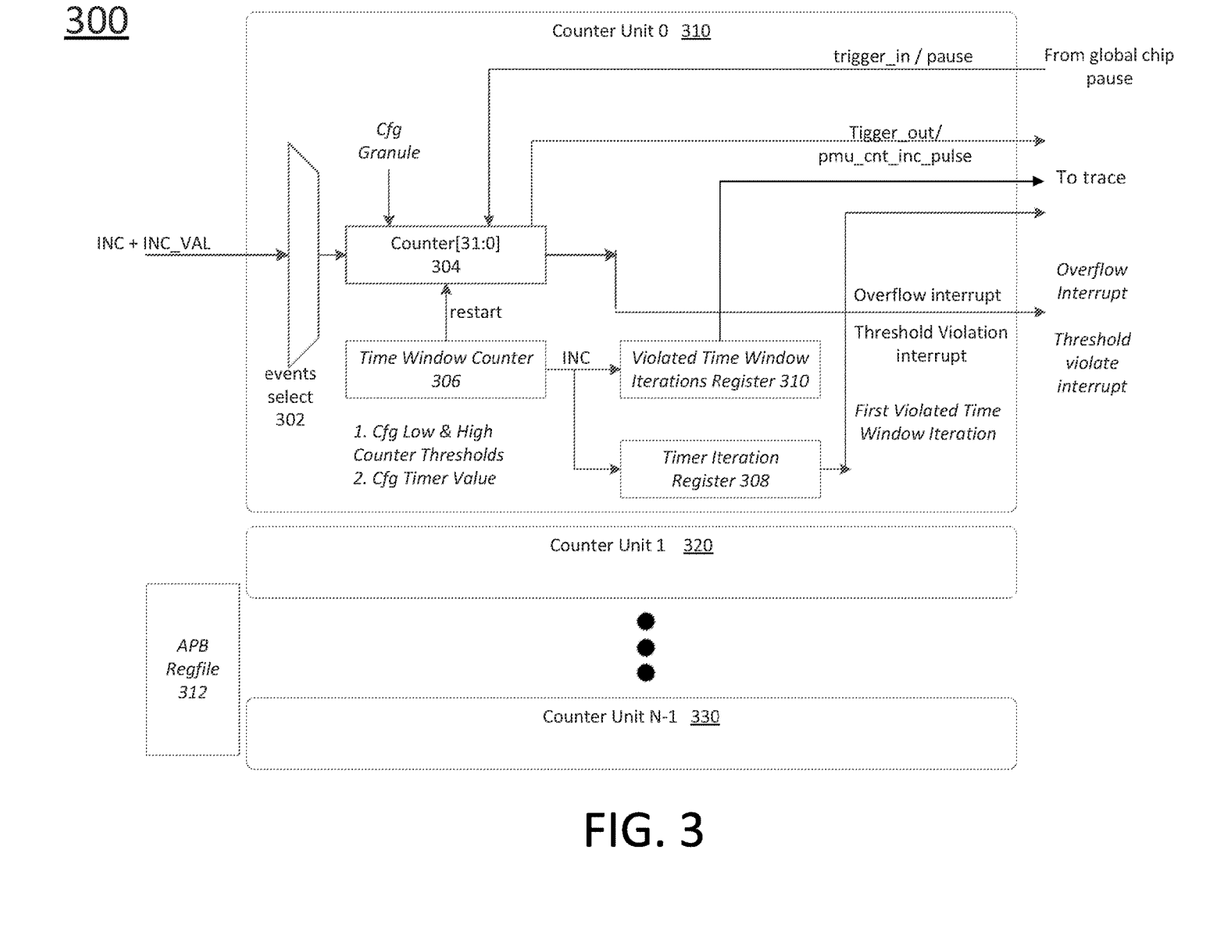
FIG. 3 is a block diagram illustrating a performance monitoring unit (PMU)

FIG. 3 is block diagram illustrating a performance monitoring unit 300 according to some embodiments of the present disclosure. As shown in FIG. 3, PMU 300 includes one or more counter units with enable, pause and restart control, such as counter unit 0 310, counter unit 1 320, . . . and counter unit N–1 330. Each counter unit may share register file (Regfile) with advanced peripheral bus (APB) and may be fully accessible by a software tool through an APB interface. Each counter unit may also be configured to generate and output interrupt signals and/or trigger signals.

In each counter unit, for example, counter 0 310, a programmable event selection multiplexer 302 can be used to select an event to be monitored by the counter unit. The selected event is then counted by an event counter 304. Event counter 304 may be of any suitable size, such as 16-bit, 32-bit, or 64-bit. Event counter 304 may be programmed with a low threshold, a high threshold, or a granule. The low threshold and the high threshold may be used individually or in combination to compare with the counted value in event counter 304 in determining whether to generate an interrupt and/or trigger signal.

The granule may be any integer number, such as, for example, from 1 to $2^{32}-1$. In some embodiments, the granule may be the maximum count value of the event counter. In some embodiments, event counter 304 may be incremented when the programmed granule value is reached. In some embodiments, each time the programmed granule value is reached or event counter 304 is incremented, a PMU counter increment pulse may be sent as a trace trigger signal for real-time hardware tracing of hardware events through performance monitor trace multiplexer 118 to system trace channel 112 as shown in FIG. 1.

In some embodiments, each counter unit includes a time window counter 306 that determines the time window during which the selected event is counted. In some embodiments, multiple or all count units within a PMU may share a time window counter. Time window counter 306 is incremented at each clock cycle, either at the rising edge or the falling edge of the clock. Counting time value of the time window counter 306 is reconfigurable. When the programmed counting time value of time window counter 306 is reached, a timer iteration register 308 is incremented by 1, time window counter 306 restarts time counting from 0, and time window counter 306 asserts a restart signal on event counter 304 to restart event counter 304.

Event counter 304 counts the incoming events from event selection multiplexer 302 in each time window set by time window counter 306. If the counted value of event counter 304 overflows within a time window, an overflow interruption signal is generated and sent to a system interrupt controller as shown in FIG. 1. In some embodiments, the overflow interrupt may be enabled or disabled by setting a corresponding control register globally or locally. In some embodiments, a trigger signal may also be generated when event counter 304 overflows. In some embodiments, other event counters may pause counting when a trigger signal is generated after event counter 304 overflows.

If, in a time window, event counter 304 does not overflow and the counted value does not fall below the pre-programmed low threshold or above the pre-defined high threshold, time window counter 306 increases timer iteration register 308 by 1, resets the time window counter 306, and sends a trigger signal to event counter 304 to restart event counter 304. If the counted value of event counter 304 within a time window is below the pre-programmed low threshold value or is above the pre-programmed high threshold value, the counted value may be recorded, a trigger signal may be generated, the value in time iterations register 308 (which indicates the number of time window iterations after which a threshold violation is detected) may be recorded, the time iteration register may be reset, and a violated time window iterations register 310 (which indicates the total number of time windows in each of which a threshold violation happens) may be incremented by 1. Additionally, an interrupt signal may be generated when the counted value of event counter 304 within a time window is below the pre-programmed low threshold value or is above the pre-programmed high threshold value. The interrupt signal is sent to an interrupt controller as shown in FIG. 1 for handling by the interrupt controller.

PMU 300 may also include interfaces with global enable and trigger input (or pause) control signals for all event counters in a PMU or an entire system. The global enable control signal enables or disables all event counters. The global trigger input may pause all event counters and/or initiate the reading of the counted values in the event counters and related registers, such as time iterations register 308. Each event counter may also be controlled by global or local control registers that can be programmed internally by a system controller coprocessor or externally by a debugger or other software debug tools. For example, a local register may be set for an event counter such that the event counter will not be paused even if an active trigger input is received.

In some embodiments, if the counted value of event counter 304 within a time window is below the pre-programmed low threshold value or is above the pre-programmed high threshold value, or a global trigger input is received, counter circuit 310 or event counter 304 may also record counted values in event counter 304 during counting periods before and/or after the counting period during which a threshold violation occurs or a global input trigger is received. In this way, the behavior of a functional block can be recorded over time and used for debugging the threshold violation or overflow in the functional block or other functional blocks. The number of counting periods before and/or after the counting period during which the threshold violation occurs or the global input trigger is received may be programmable.

In some embodiments, a counter unit may be used to count values associated with the counted event signal (provided by a circuit that integrates a PMU as an input).

The PMU described above may be instantiated in integrated engines and peripherals across a system or an integrated circuit as described in the examples below.

For example, one PMU may be instantiated in each CPU. Each CPU PMU may provide an array of counter units, such as 2 or more, 4 or more, or 6 or more counter units. Each counter unit can be configured to count any events available in the CPU, and can be used for different statistics collection, such as instructions execution, exceptions, level 1 (L1) and level 2 (L2) caches access, translation lookaside buffer (TLB) and page-table walk accesses, external bus accesses, exclusive accesses, and branch predictions. For example, a software tool can use the CPU PMU to measure L1 data cache hit rate by programming a counter unit to count total L1 data cache access events and another counter unit to count total L1 data cache refill events.

A PMU for coherency fabric may also provide a plurality of counter units, such as 4 or more counter units. Each counter unit can be configured to count any event occurring in the coherency fabric, including transaction occurrence types, slaves responses, internal queues, and congestion points states. For example, a software tool may use the coherency fabric PMU to measure snoop hit rate for read requests on a particular slave interface by programming one of the event counter to count shareable read requests and another event counter to count number of snoop hits.

A PMU in a memory controller based on the PMU architecture illustrated in FIG. 3 can provide one or more counter units to monitor various events available in the memory controller, such as transaction occurrence types, memory scheduling, arbitration, queues status, and power management events. For example, a software tool can use the PMU in the memory controller to measure memory scheduler efficiency on accessing open pages by programming one event counter to count total read or write access events and another event counter to count total hits in open page read or write to determine an open page hit rate.

III. Operation of the Performance Monitor

1. Event Counting

A counter unit in a PMU can count any selected event occurring in a functional block of a system or integrated circuit. The event to be monitored can be selected using a counter control register. The counter unit may first be configured by setting counter configuration register fields, such as index of the event to monitor, counter granularity, counter thresholds, overflow status generation for high counter and low counter, and self-triggering (on which event to assert the trigger out). The counter unit may be enabled by setting counter enable bit in a counter control register. A time window counter (timer) may also be configured before the event counting starts. The time window counter can be configured by setting a timer interval at which the event counter is examined and compared with the programmed high and/or low threshold. The threshold setting may depend on the type of event being monitored. For example, for some events, such as Ethernet receive flow, only a low threshold value may be set such that a trigger is asserted only if the receive rate is less than a threshold value. For some events, such as exception errors, only a high threshold may be set such that a trigger is asserted only when the counted exception errors exceed the threshold value. In some other events, both a high threshold and a low threshold may be set such that a trigger is asserted only when the counted value falls outside of the low and high threshold boundaries. Once configured, the counter unit may begin to count the selected events in a series of time windows as determined by the time window counter in the counter unit or the time window counter shared by counter units in the PMU.

A. Operations of the Time Window Counter

Figure 4A:
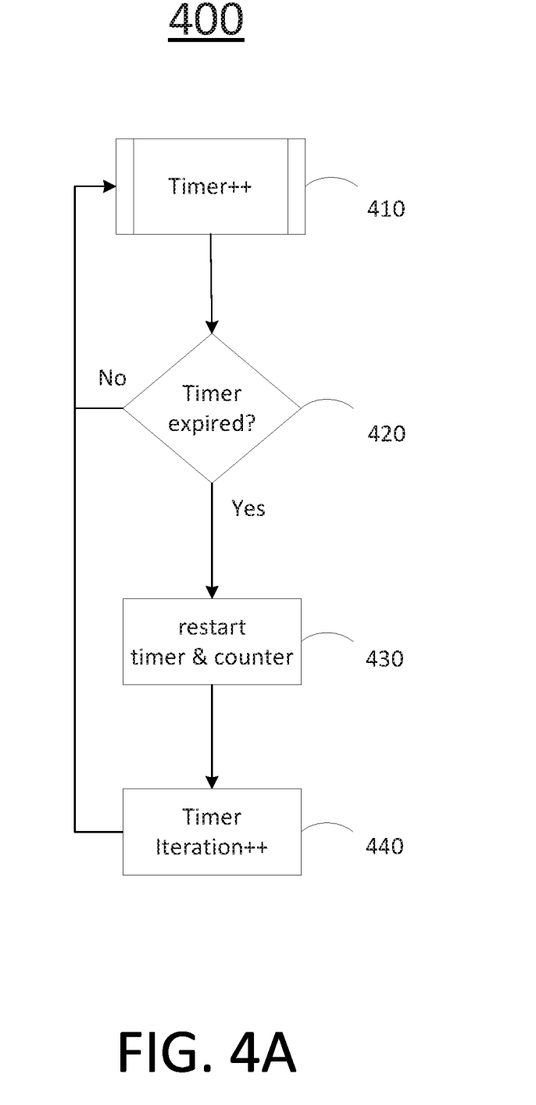
FIG. 4A is a flow chart illustrating an operation of a time window counter.

FIG. 4A is a Flow Chart 400 illustrating Operations of a Time Window Counter. The Time window counter is a timer that starts at zero. At block 410, the time window counter is incremented in every clock cycle at either the rising edge or falling edge of the clock signal. At clock 420, the time window counter checks whether the timer expires (or whether the counted value of the time window counter reaches the pre-programmed timer interval value). If the counted value of the time window counter has not reached the pre-programmed timer interval value, the time window counter continues to count the clock signal. At block 430, if the counted value of the time window counter has reached the pre-programmed timer interval value, the time window counter restarts from 0, and sends a restart signal to restart the associated event counter(s). Additionally, at block 440, the time window counter updates a timer iteration register each time the counted value of the time window counter reaches the pre-programmed timer interval value. The timer iteration register counts the number of timer intervals that have passed since the event counter is first started and before a first threshold violation in the event counter is recorded.

B. Operations of the Event Counter

Figure 4B:
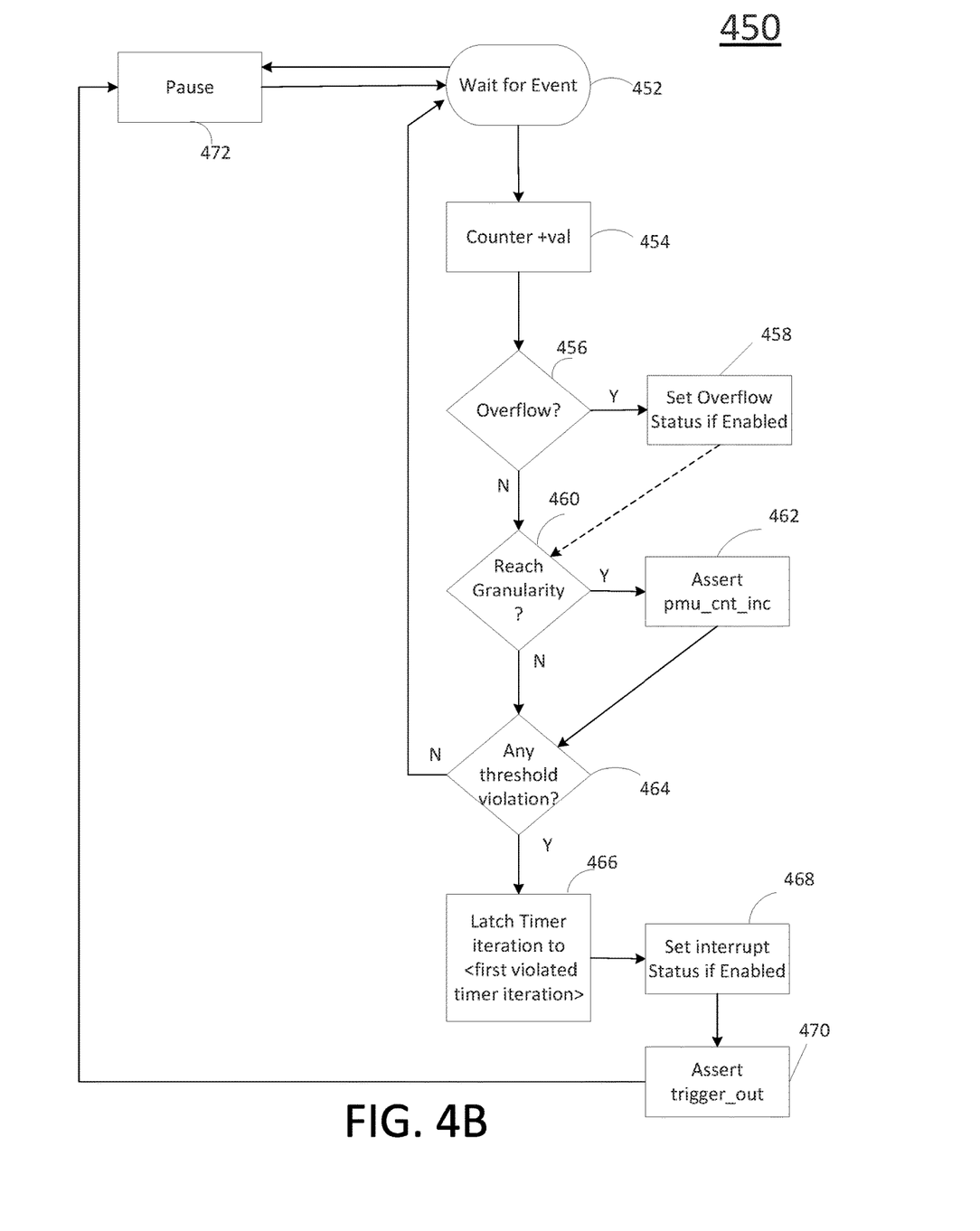
FIG. 4B is a flow chart illustrating an operation of an event counter.

FIG. 4B is a flow chart 450 illustrating operations of an event counter after the corresponding counter control and configuration registers are programmed and the event counter is enabled to start counting a selected event.

The event counter starts at 0 once enabled. At block 452, the event counter waits for an occurrence of a selected event. At block 454, for every clock cycle, the event counter value may be incremented if the event is active at the rising clock edge or falling edge of the clock signal. At block 456, if the event counter wraps around itself, i.e., the event counter overflows, a counter overflow status is set in an internal status register and an overflow interrupt signal is sent to an interrupt controller at block 458. If the event counter does not overflow, the event counter may check if the programmed granularity is reached at block 460. Each time the programmed granularity is reached, a PMU counter increment pulse signal may be asserted at block 462. At block 464, counted value of the event counter is examined and compared with the programmed high and/or low threshold at the end of a time window. If the counted value does not violate the set threshold, the event counter waits for the next event to occur. If the counted value of the event counter violates the set threshold, such as below a programmed low threshold for some types of events, above a programmed high threshold for some types of events, or falling outside of the program low and high threshold boundaries for some types of events, the counted value is latched at block 466. At block 468, when the counted value violates the set threshold, an interrupt status is set in an internal status register and a threshold violation interrupt is sent to the interrupt controller. At block 470, a trigger signal is asserted, for example, to the PMU cross trigger network for triggering other event counters. At block 472, the event counter may be paused if the counted value violates the set threshold. If a trigger signal is asserted by other event counters through the PMU cross trigger network, the event counter and the time window counter may also be paused until the trigger signal is deasserted. Otherwise, the event counter may be restarted when triggered by a restart signal from the time window counter.

2. Overflow Interrupt

If the overflow interrupt function of an event counter is enabled through, for example, a local configuration register, or if global overflow interrupt function of a system is enabled through, for example, a global control register, a counter unit may generate an interrupt signal or an interrupt request when its event counter overflows. In some embodiments, when an overflow occurs in a counter unit, a corresponding bit in a global overflow status register can be set, thus the global overflow status register may be read to get the overflow status of each counter unit.

In some embodiments, a performance monitoring unit may generate an interrupt signal when overflow occurs on any of its counter units, thus a single interrupt summary signal may be provided to the system/chip interrupt controller by a PMU having multiple counter units.

In some embodiments, a counter unit continues the event counting after an overflow occurs. In some embodiments, a counter unit in a performance monitoring unit may be programmed to pause counting when an overflow occurs on any other counter in the PMU or in the system/chip, by setting the corresponding bit(s) in a configuration register. For example, the configuration register for counter unit 2 may be programmed to pause counter unit 2 whenever an overflow occurs on counter unit 0, 2 or 3 by setting the corresponding bits for counter units 0, 2 and 3, for example, bits [31:28] of a 32-bit configuration register for counter 2 to [4'b1011]. A counter unit may resume counting when the corresponding bit(s) in the configuration register of the counter unit or the overflow status register is cleared.

3. Triggering

The performance monitor unit may provide trigger signals to facilitate the programming and triggering of an external debugger tool. In some embodiments, a pulse signal may be generated and exported whenever an event counter reaches the programmed granule value. For example, if the granule value for counter unit 2 is programmed to 1024, counter 2 may generate an increment trigger for every 1024 event occurrences. The pulse signal may be used for system tracing by a debugging tool or a profiling tool.

In addition, the PMU may provide a trigger signal to the PMU cross trigger network to generate a global pause trigger for pausing all counter units in the PMU or the system. Such trigger signal may be generated when a threshold violation occurs in a counter unit in a time window, or an overflow occurs in a count unit. When a global pause trigger is asserted, all counter units may pause counting; when a global pause trigger is deasserted, the counter units may resume counting. The pausing of a counter unit by a trigger signal may be enabled or disabled by setting the corresponding bit(s) in the configuration register for the counter unit. If the pausing of a counter unit by a trigger signal is enabled, the counter unit can pause counting upon receiving the trigger signal. Otherwise, the counter unit may continue counting even after receiving the trigger signal.

In embodiments where a PMU includes multiple counter units, a trigger signal may not be generated if there is a threshold violation or overflow in only one counter unit during a counting period. Rather, a trigger signal may be generated only if there are threshold violations or overflows in two or more counter units during a same counting period.

In some embodiments, a trigger signal may not be generated if there is a threshold violation or overflow in a counter unit during only one counting period. Instead, a trigger signal may be generated only if there are threshold violations or overflows in a counter unit during two or more consecutive counting periods. Thus, only events that are consistent or repeatable may trigger the pause of the PMUs. In this way, spikes, noises, instabilities or other non-repeatable or transient events may be filtered out.

IV. PMU Cross Trigger Network

Because PMUs in a system may be distributed onto various functional blocks across the system to enable fine-grained and concurrent profiling of the various functional blocks, a PMU cross trigger network may be used to collect the trigger signals generated by the distributed PMUs connected to the PMU cross trigger network, generate a global pause signal, and feed the global pause signal to each connected PMU.

Figure 5:
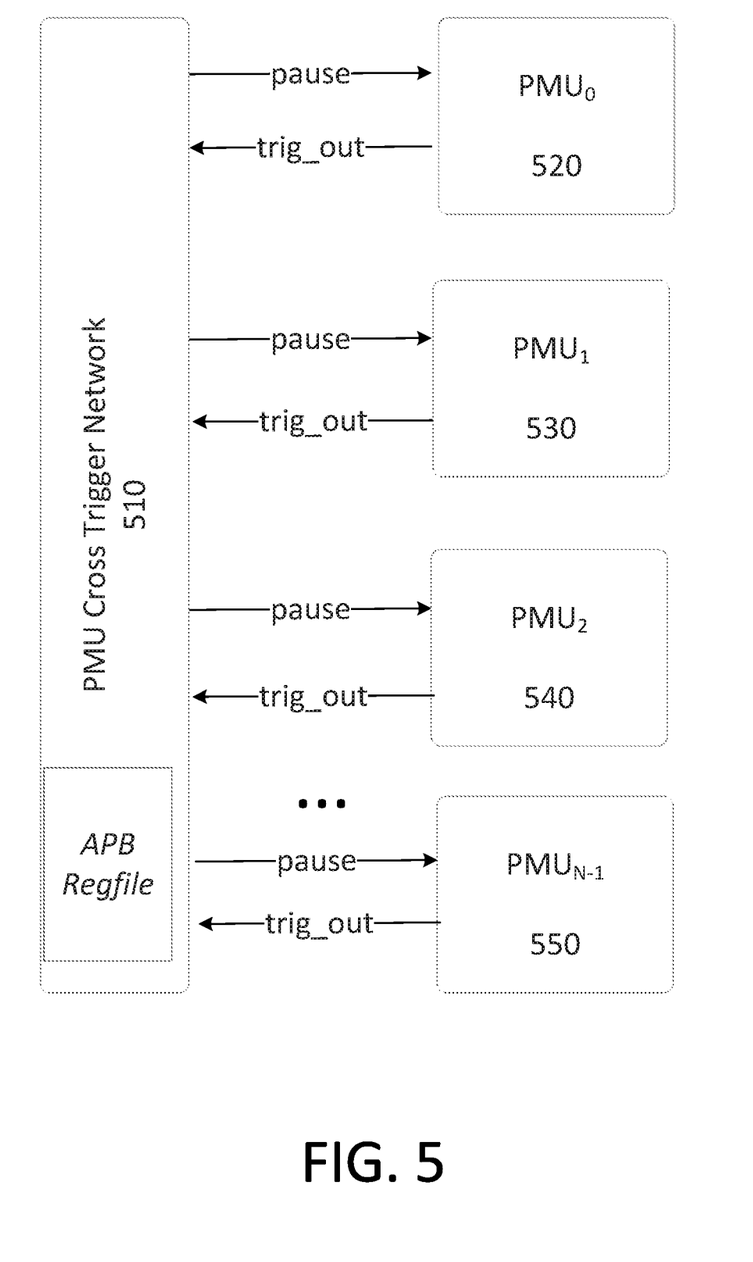
FIG. 5 is a block diagram of a PMU cross trigger network coupled to a plurality of PMUs.

FIG. 5 is a block diagram illustrating a PMU cross trigger network 510 connected to N performance monitoring units, $PMU_0$ 520, $PMU_1$ 530, $PMU_2$ 540, . . . and $PMU_{N-1}$ 550.

Each PMU communicates with PMU cross trigger network 510 through at least a trig_out signal path and a pause signal path. The trig_out signal may be generated by a PMU upon detection of a threshold violation in a time window in any of its counter units as described above in the present disclosure. In some embodiments, the trig_out signal may also be generated by a PMU when an overflow occurs in any one of its counter units. After receiving the trig_out signal from any PMU, PMU cross trigger network 510 may generate a global pause signal (or global input signal) and distribute the global pause signal to PMUs that are programmed to receive the global pause signal through, for example, register setting.

In various embodiments, PMU cross trigger network 510 may not generate a global pause signal if it receives a trig_out signal from only one PMU during a counting period. Rather, a global pause signal may be generated only if PMU cross trigger network 510 receives two or more trig_out signals during a same counting period.

PMU cross trigger network 510 may be programmed or controlled through, for example, an APB interface, to define a group of PMUs that will be paused when a trigger signal is asserted by any member of the group. For example, a PMU group register [N−1:0] may be used for a group of N PMUs with one bit for each PMU, where each bit i of the PMU group register specifies whether the corresponding $PMU_i$ is an active member of the group that should be paused after receiving the pause signal. By way of example, in a case where N=4, if the PMU group register is programmed to 4'b1101 and a trig_out is generated by $PMU_2$ 540, PMU cross trigger network 510 would assert a pause signal on $PMU_0$ and $PMU_3$ to stop the counter units in $PMU_0$ and $PMU_3$.

In various embodiments, for a PMU with multiple counter units, a per PMU local register may be used to specify which counter units are to be paused upon receiving the global pause signal. Alternatively, a PMU group register may include one bit for each counter unit in the group of PMUs connected to PMU cross trigger network 510.

In some embodiments, a system may also include one or more groups of PMUs in a centralized cross trigger network, each group of PMUs handling one process or flow in the system. Thus, multiple processes or flows can be monitored at the same time. In some embodiments, a system may include one or more PMU cross trigger networks, each cross trigger network in electrical communication with a different group of PMUs in the system and monitoring a different process or flow in the system.

V. Hardware Performance Debugging

In many applications, it is desirable to find the root cause for hardware performance fluctuations and instability. However, many performance fluctuations and instability may happen only during short time intervals, and the exact time and location of the hardware failure or degradation may be unknown. Thus, it is difficult to debug the problem on a system level application, and it is desirable that a performance monitor could facilitate real time debug of short time hardware performance fluctuations or instability. The PMUs described in the present disclosure provides an efficient and easy-to-use way for a user to debug hardware performance issues in real-time. High-resolution non-invasive profiling and debugging methods based on the performance monitoring units described above are provided according to some embodiments of the present disclosure.

1. At-Time Window Hardware Profiling

Figure 6:
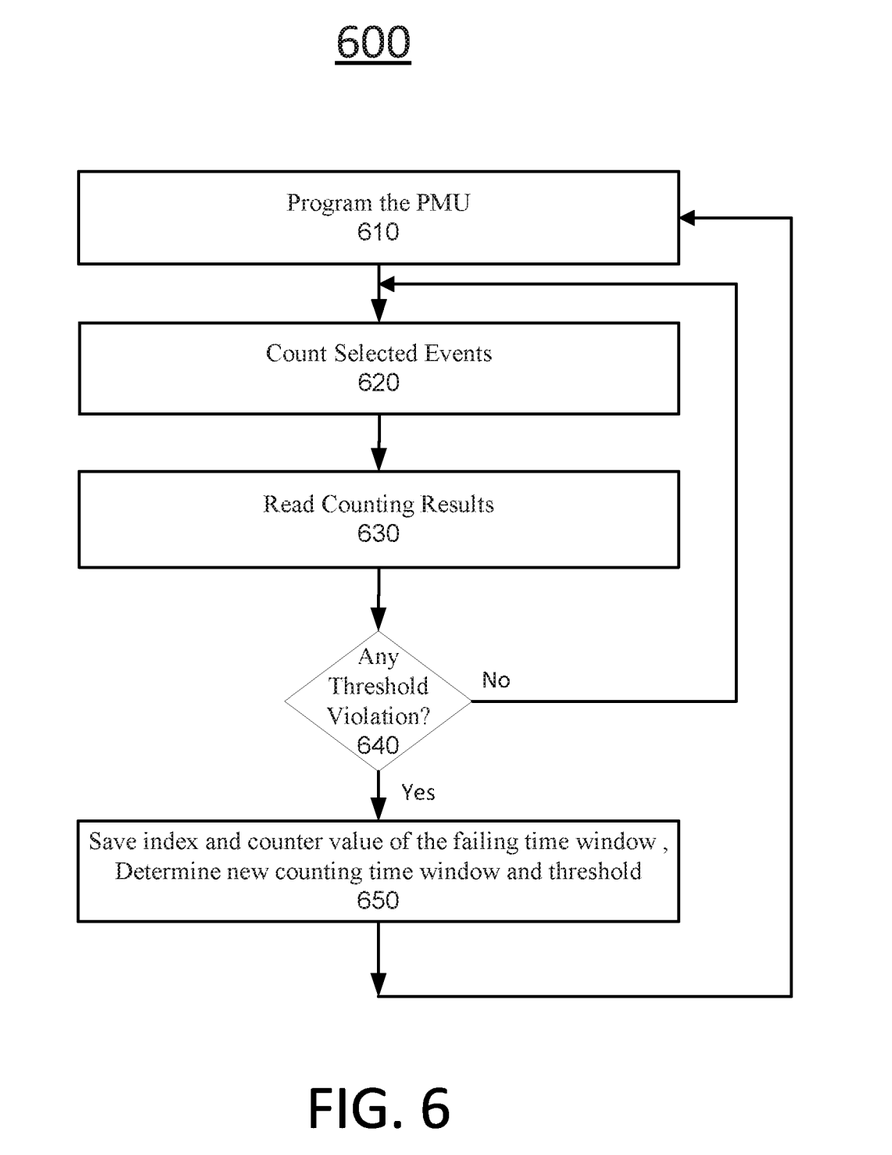
FIG. 6 is a flow chart illustrating a method of identifying the precise time when an undesired event happens in a functional block.

FIG. 6 is a block diagram illustrating a method of identifying the time when an undesired event happens in a functional block. At block 610, the PMU in a functional block to be monitored is programmed, which may include selecting the event to monitor, setting sample rate or counting time window, and setting threshold(s) and granule. At block 620, the PMU starts to count the selected events in a counting time window. At block 630, the counting results are read out at the end of a counting time window. At block 640, the counting results are checked for any threshold violation. If no threshold violation occurs in the counting time window, a time window index is increased by 1, and the PMU restarts at 0 and continues to count the selected event. At block 650, if a threshold violation occurs in the counting time window, for example, if the counter value falls out of the pre-programmed threshold boundaries, the index and counter value of the failing time window are saved, and a new counting time window and a new threshold setting for zooming-in in time domain are determined. The new counting time window and new threshold setting can then be set for the PMU, and the PMU may start to count the selected event under the new setting. This programmable counting time window (or sampling rate) enables zoom in/out in time domain for identifying the exact time of a hardware failure.

For example, the above method can be used to monitor an Ethernet receive flow that should not fall below 8 M packets per second (pps), and to identify the first time the receive flow falls below 8 M pps. First, a PMU in the Ethernet portion of the system is programmed to count received headers of packets in each time window of, for example, one second, and the low threshold of the counter value is set to 10 M. The PMU starts to count the received headers. At the end of the one second time window, the counter value is read out and checked for threshold violation against the set threshold value. If there is no threshold violation, a time window index is increased by 1 and the PMU restarts to count the received headers under the same setting. If a threshold violation is detected, the index and counter value of the failing time window are saved, and the PMU can be reprogrammed to count received headers of packets in each time window of, for example, one millisecond with a low threshold of the counter value set to 10 K. The PMU restarts the counting under the new setting. If a violation is again detected, further zooming can be done by setting the time window to an even shorter period and the low threshold to a smaller number if necessary.

2. At-time Window Multiple Counters Correlation

When a performance degradation is detected, a root cause for the degradation needs to be identified in order to find a solution for the degradation. Using regular tools, one may need to debug other counters on the functional path and look for exceptional local behavior of other circuitry on the functional path at around the same time point. The amount of debug work can be greatly reduced by providing a user with the status of all other counters within the same violated time window. The PMU and the PMU cross trigger network described in the present disclosure enable synchronization and cross triggering between different PMUs and/or counter units.

Through a start or restart control on the counter units in the PMUs, a global start signal can activate all counter units simultaneously to synchronize the counting time windows or sampling periods for different counter units. Through a cross trigger network, such as PMU cross trigger network 510 shown in FIG. 5, cross-triggering between a group of PMUs or all PMUs on a system can be achieved. The cross trigger network can receive a trig_out signal from one PMU and distribute a pause signal to all other PMUs after receiving the trig_out signal. As a result, exceptional events on one PMU, such as a threshold boundaries violation, may trigger all other PMUs to pause counting. The counter values of all PMU counters and other data, such as the iteration number of the time window in which a first violation occurs, can be read out and processed. Because the counter value is sampled and compared against the set threshold at the end of each time window, the trig_out signal will occur at the end of each counting period, and therefore would not cause other PMUs to stop counting in the middle of a counting time window.

For example, in one embodiment, an Ethernet receive first-in-first-out (FIFO) PMU may be set to count the number of dropped packets, an inbound PCIe PMU may be set to count the number of received memory mapped I/O (MMIO) transactions to a local memory, and a system fabric PMU may be set to count the number of cycles in which a fabric is stalled due to internal hazards. The sampling period may be set to one microsecond, and the Ethernet receive FIFO PMU may be programmed to generate a trig_out signal whenever a single (or any other number of) "packet drop" event occurs. When a trig_out is generated, all other counter units can be forced to pause counting. The PCIe transaction rate and system fabric hazard status in the time window when the packet drop event occurs can be determined based on the recorded counter values of the PCIe PMU and the system fabric PMU to help debugging the root cause of the packet drop.

Figure 7:
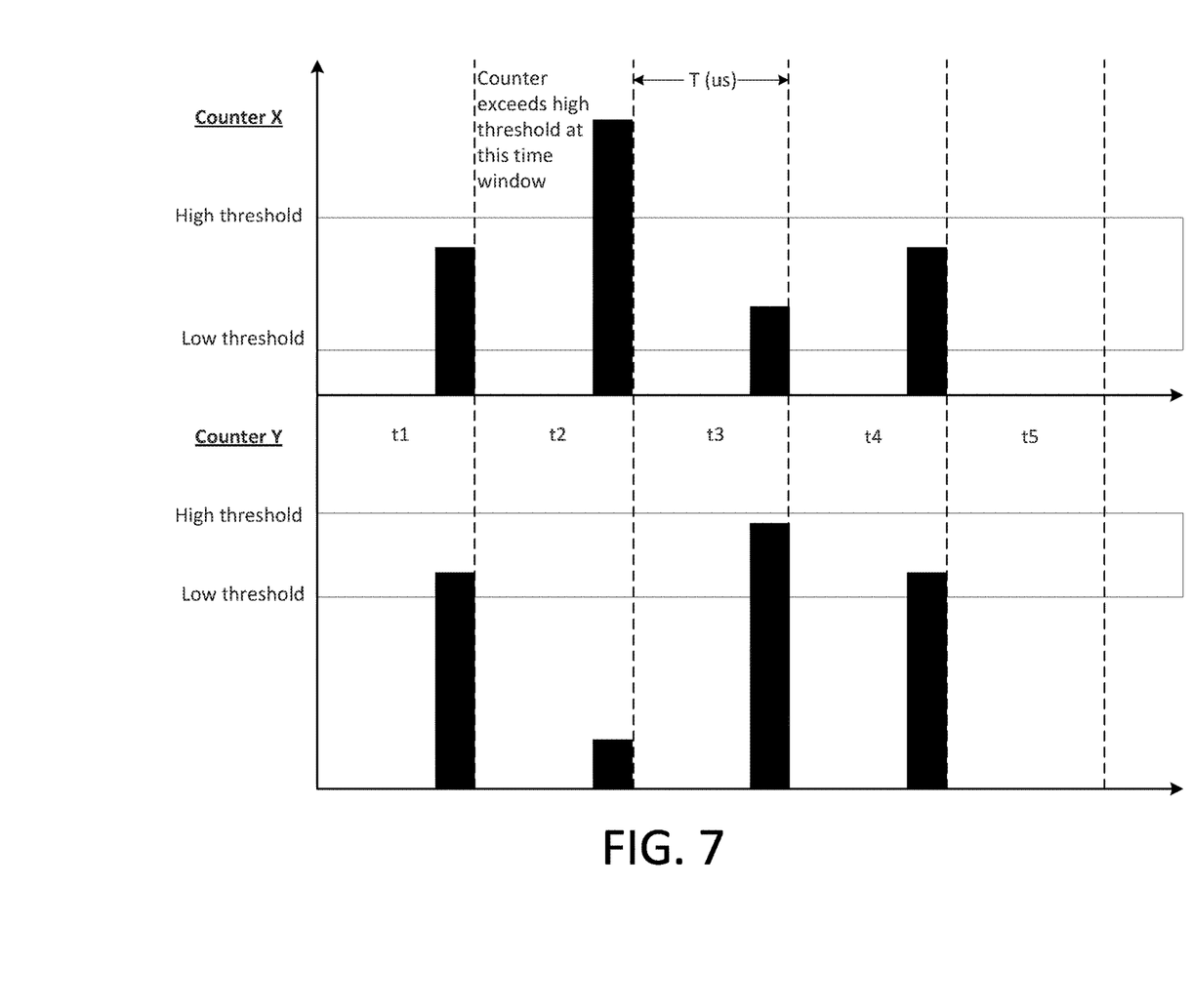
FIG. 7 illustrates an example of cross triggering between two event counters.

FIG. 7 illustrates an example of cross triggering between two different counters X and Y. In FIG. 7, counter X and counter Y are programmed with same sampling rate or counting time window but with different threshold boundaries. At counting time window t1, no threshold violation occurs on either counter X or counter Y. At counting time window t2, the counter value of counter X exceeds a high threshold; the counter value of counter X in time window t2 is latched or recorded; and a trigger signal is generated and passed on to counter Y to latch or record the counter value of counter Y. The latched or recorded counter values from both counter X and counter Y can be read out for hardware performance analysis and debug.

3. Event-based Tracing Out

In some embodiments, CPU executed code with corresponding timestamp and hardware event may also be traced out using the PMUs and cross trigger network described in the present disclosure. The distributed PMU architecture makes the system capable of tracing out the occurrence of multiple selected events, for example, 4, 6, 8, 12, 16, or 32 different events, concurrently toward a system trace channel with their corresponding timestamps. This enables correlations between different PMUs' events, and/or correlations between the executed code and internal PMU events of the system. Tracing out may be activated or triggered when, for example, a counter reaches a programmed granularity value, such as every 512 events, or a counter value falls outside of programmed threshold boundaries.

VI. Interfaces with System Trace and Debug

Figure 8:
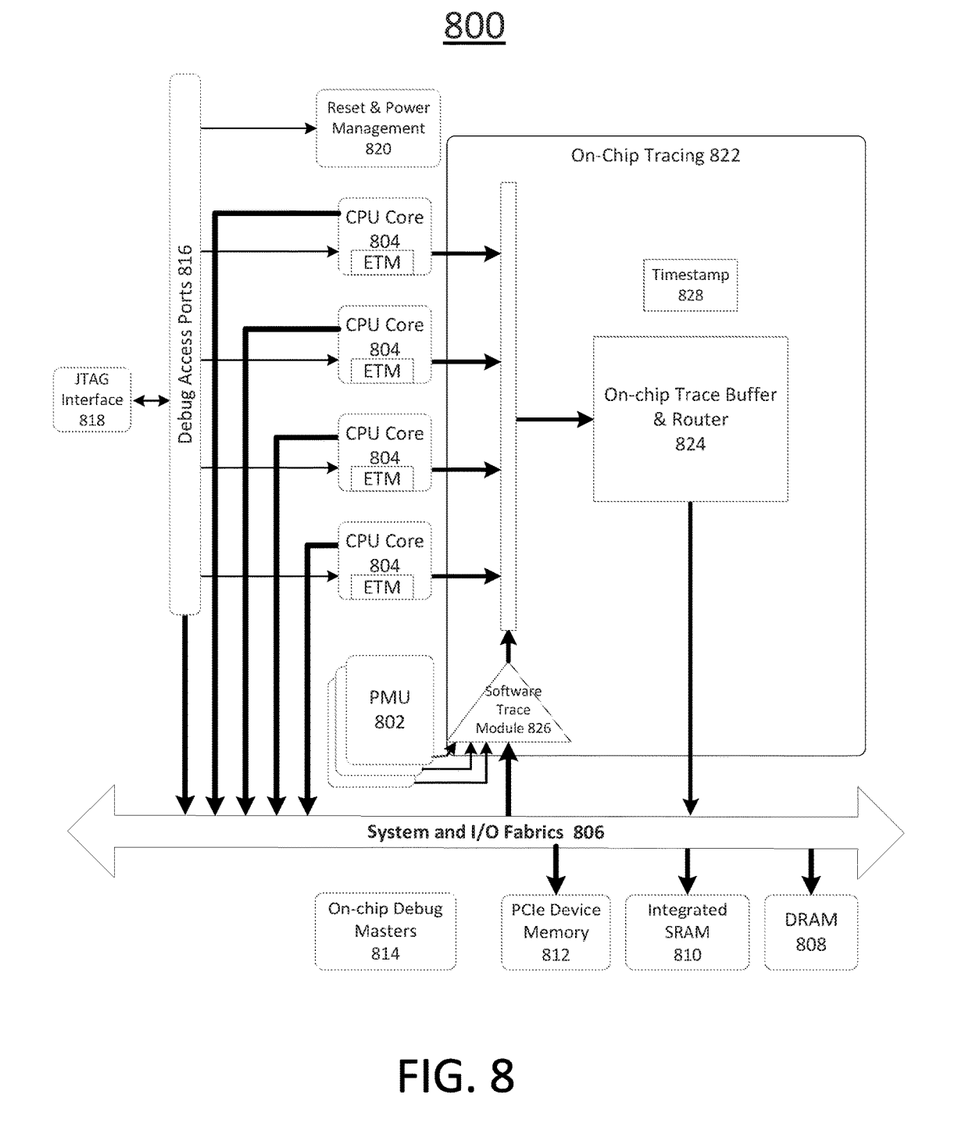
FIG. 8 is a block diagram illustrating interfaces between on-chip performance monitoring units and system debug and trace structures.

FIG. 8 is a block diagram illustrating interfaces between on-chip performance monitoring units and system debug and trace structures. In FIG. 8, a system 800 may include multiple CPU cores 804, system and I/O fabrics 806, a DRAM 808, an integrated SRAM 810, a PCIe device memory 812, an on-chip debug masters 814, a debug access ports 816, a joint test action group (JTAG) interface 818, and a reset and power management 820. CPU cores 804, DRAM 808, integrated SRAM 810, PCIe device memory 812 and debug access ports 816 can be connected through system and I/O fabrics 806. JTAG interface 818 communicates with the system through debug access ports 816. Functional blocks of system 800, such as CPU cores 804, reset and power management 820, system and I/O fabrics 806, DRAM 808, integrated SRAM 810, PCIe device memory 812, and on-chip debug masters 814 can be debugged through debug access ports 816 directly or indirectly.

In addition, each CPU core 804 may include an embedded trace module (ETM) and a PMU 802 that communicate with an on-chip tracing circuit 822. Each performance monitoring unit may export a set of counter increment events or other events to be traced out. The on-chip tracing circuit 822 may include a software trace module 826 and an on-chip trace buffer and router 824 with timestamp circuit 828 for recording and/or storing corresponding timestamps of traced-out events. On-chip trace buffer and router 824 may include performance monitor trace multiplexer 118 that is programmed to select and trace out events through system trace channel 112 as shown in FIG. 1. Software trace module 826 and on-chip trace buffer and router 824 may be connected to system and I/O fabrics 806 for communications with other functional blocks in system 800.

VII. System and Applications

Figure 9:
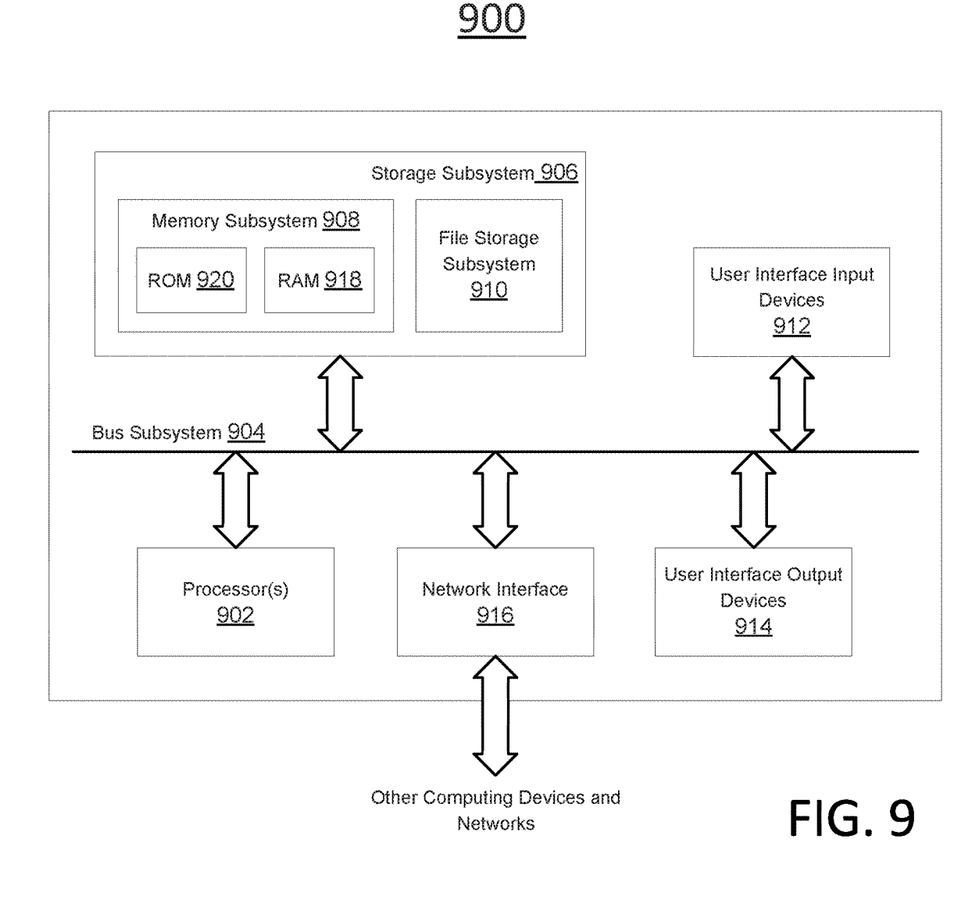
FIG. 9 is a block diagram of a computer system on which distributed PMUs according to various embodiments of the present disclosure may be implemented.

FIG. 9 is a simplified block diagram of a computer system 900 according to an embodiment of the present disclosure. As shown in FIG. 9, computer system 900 can include one or more processors 902 that communicate with a number of peripheral devices via a bus subsystem 904. These peripheral devices can include a storage subsystem 906 (comprising a memory subsystem 908 and a file storage subsystem 910), a user interface input devices 912, a user interface output devices 914, and a network interface subsystem 916.

In some embodiments, internal bus subsystem 904 can provide a mechanism for facilitating the various components and subsystems of computer system 900 to communicate with each other as intended. Although internal bus subsystem 904 is shown schematically as a single bus, alternative embodiments of the bus subsystem can utilize multiple buses. Additionally, network interface subsystem 916 can serve as an interface for communicating data between computer system 900 and other computer systems or networks. Embodiments of network interface subsystem 916 can include wired interfaces (e.g., Ethernet, CAN, RS232, RS485, etc.) or wireless interfaces (e.g., ZigBee, Wi-Fi, cellular, etc.).

In some embodiments, user interface input devices 912 can include a keyboard, pointing devices (e.g., mouse, trackball, touchpad, etc.), a barcode scanner, a touch-screen incorporated into a display, audio input devices (e.g., voice recognition systems, microphones, etc.), and other types of input devices. In general, the term "input device" is intended to include all possible types of devices and mechanisms for inputting information into computer system 900. Additionally, user interface output devices 914 can include a display subsystem, a printer, or non-visual displays such as audio output devices, etc. The display subsystem can be any known type of display device. In general, the term "output device" is intended to include all possible types of devices and mechanisms for outputting information from computer system 900.

Storage subsystem 906 can include memory subsystem 908 and file/disk storage subsystem 910. Subsystems 908 and 910 represent non-transitory computer-readable storage media that can store program code and/or data that provide the functionality of embodiments of the present disclosure. In some embodiments, memory subsystem 908 can include a number of memories, including a main random access memory (RAM) 918 for storage of instructions and data during program execution and a read-only memory (ROM)

920 in which fixed instructions may be stored. File/disk storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and is not intended to limit embodiments of the present disclosure. Many other configurations having more or fewer components than system 900 are possible.

The drawings and the description above describe non-limiting embodiments of systems and methods. The specification and drawings are, accordingly, to be regarded in an illustrative rather than a restrictive sense. It will, however, be evident that various modifications and changes may be made thereunto without departing from the broader spirit and scope of the disclosure as set forth in the claims.

While the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the embodiments depicted herein are merely exemplary, and that in fact many other embodiments may be implemented while achieving the same functionality.

Also, for example, in some embodiments, the illustrated examples may be implemented as circuitry located on a single integrated circuit or within a same device. Alternatively, in some embodiments, the examples may be implemented as any number of separate integrated circuits or separate devices interconnected with each other in a suitable manner.

Also, for example, the examples, or portions thereof, may be implemented as software or code representations of physical circuitry, or of logical representations convertible into physical circuitry, such as in a hardware description language of any appropriate type.

Other modifications, variations and alternatives are also possible. The specifications and drawings are, accordingly, to be regarded in an illustrative rather than in a restrictive sense.

Some embodiments may include a variety of storage media and computer readable media for storing data and instructions for performing the disclosed methods. Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "connected" and "coupled" are to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A distributed performance monitoring circuit, comprising:
    a plurality of performance monitors, each performance monitor corresponding to a respective functional block of a system and including a counter circuit, wherein the counter circuit includes:
        a programmable time window counter configured to determine an adjustable counting period; and
        an event counter configured to count a number of occurrences of an event occurring in the respective functional block during the counting period, the event being a type of activities occurring in the respective functional block; and a cross-trigger network coupled to the plurality of performance monitors, wherein the cross-trigger network is configured to:

receive an output trigger signal from a performance monitor of the plurality of performance monitors when the number of occurrences of the event occurring in the corresponding functional block during the counting period is outside of a threshold band for the performance monitor; and send an input trigger signal to the plurality of performance monitors based on receiving the output trigger signal.

2. The distributed performance monitoring circuit of claim 1, wherein the plurality of performance monitors includes groups of performance monitors, and wherein, in response to receiving the output trigger signal from a member of a group of performance monitors, the cross-trigger network sends the input trigger signal to other members of the group of performance monitors.

3. The distributed performance monitoring circuit of claim 1, wherein the cross-trigger network is configured to send the input trigger signal to the plurality of performance monitors when at least two performance monitors generate output trigger signals in a same counting period.

4. The distributed performance monitoring circuit of claim 1, wherein each performance monitor is configurable to pause counting when the event counter in any one of the plurality of performance monitors overflows.

5. The distributed performance monitoring circuit of claim 1, wherein the event counter is configured to record the number of occurrences of the event occurring in the corresponding functional block during the counting period when the number of occurrences of the event is outside of a threshold band for the corresponding performance monitor or when the event counter receives the input trigger signal.

6. The distributed performance monitoring circuit of claim 1, wherein the threshold band is programmable.

7. The distributed performance monitoring circuit of claim 1, wherein the event counter is further configured to record a number of occurrences of the event during each counting period of a plurality of counting periods around the counting period during which the number of occurrences of the event is outside of the threshold band or around the counting period during which the input trigger signal is received.

8. The distributed performance monitoring circuit of claim 1, wherein:

each performance monitor further includes a trigger interface that includes an output trigger port and an input trigger port;

each performance monitor is configured to transmit the output trigger signal to the cross-trigger network through the output trigger port when the number of occurrences of the event during the counting period is outside of the threshold band for the performance monitor; and each performance monitor is configured to receive the input trigger signal from the cross-trigger network through the input trigger port.

9. The distributed performance monitoring circuit of claim 1, wherein each performance monitor is configured to generate the output trigger signal when a number of occurrences of the event during each of two or more consecutive counting periods is outside of the threshold band for the performance monitor.

10. The distributed performance monitoring circuit of claim 1, wherein a maximum counter value of the programmable time window counter is dynamically reconfigurable such that the counting period can be adjusted dynamically for different counting resolutions.

11. The distributed performance monitoring circuit of claim 1, wherein the event counter is configured to generate a trace trigger signal or increase a counter value of the event counter after a programmable number of occurrences of the event.

12. The distributed performance monitoring circuit of claim 1, wherein the counter circuit is configured to:

repeatedly count the event until the number of occurrences of the event in a first counting period is outside of the threshold band for the corresponding performance monitor; and record a number of counting periods that have passed before the first counting period.

13. The distributed performance monitoring circuit of claim 1, wherein:

each performance monitor further comprises a plurality of counter circuits, each counter circuit including a respective event counter; and each performance monitor is configured to generate the output trigger signal when a number of occurrences of an event being counted by each respective event counter of two or more event counters during a counting period is outside of a threshold band for the respective event counter.

14. The distributed performance monitoring circuit of claim 1, wherein the event counter is configured to generate an interrupt signal or an overflow trigger signal when an overflow of the event counter occurs, and wherein the overflow trigger signal is sent to the cross-trigger network.

15. The distributed performance monitoring circuit of claim 1, wherein each performance monitor is associated with a control register or a control bit, the control register or control bit, when set to a predetermined value, causing the event counter of the performance monitor to pause counting after receiving the input trigger signal.

* * * * *

UNITED STATES PATENT AND TRADEMARK OFFICE
CERTIFICATE OF CORRECTION

PATENT NO. : 10,503,624 B1
APPLICATION NO. : 16/118002
DATED : December 10, 2019
INVENTOR(S) : Adi Habusha et al.

Page 1 of 1

It is certified that error appears in the above-identified patent and that said Letters Patent is hereby corrected as shown below:

On the Title Page

(72) Please list the following Inventors as named below:
ADI HABUSHA, Moshav Alonei Abba, IL
ITAI AVRON, Petah Tikva, IL
GIL STOLER, Petah Tikva, IL Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*